United States Patent
Gupta et al.

(10) Patent No.: US 9,363,776 B2
(45) Date of Patent: Jun. 7, 2016

(54) HIGH PRECISION ACCESS POINT TO ACCESS POINT SYNCHRONIZATION IN AN INDOOR POSITION LOCATION SYSTEM

(71) Applicant: QUALCOMM Incorporated, San Diego, CA (US)

(72) Inventors: Alok Kumar Gupta, Encinitas, CA (US); William E. Stein, San Diego, CA (US); Scott Howard King, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/042,446

(22) Filed: Sep. 30, 2013

(65) Prior Publication Data
US 2015/0092753 A1    Apr. 2, 2015

(51) Int. Cl.
*H04W 56/00*    (2009.01)
*H04B 7/26*    (2006.01)

(52) U.S. Cl.
CPC ........... *H04W 56/001* (2013.01); *H04B 7/2687* (2013.01); *H04W 56/002* (2013.01); *H04W 56/0035* (2013.01)

(58) Field of Classification Search
CPC ............... H04B 1/7163; H04B 1/7183; H04B 2001/6908
See application file for complete search history.

(56) References Cited

U.S. PATENT DOCUMENTS

| | | | |
|---|---|---|---|
| 7,653,166 B2 | 1/2010 | Wagner et al. | |
| 7,839,916 B1 * | 11/2010 | Luecke et al. | 375/147 |
| 8,472,500 B2 | 6/2013 | Marton et al. | |
| 8,898,340 B2 * | 11/2014 | Vange et al. | 709/250 |
| 2009/0310649 A1 | 12/2009 | Fisher et al. | |
| 2013/0073679 A1 | 3/2013 | Fellman et al. | |

FOREIGN PATENT DOCUMENTS

| | | |
|---|---|---|
| WO | WO-2011153291 A2 | 12/2011 |
| WO | WO-2012158578 A1 | 11/2012 |
| WO | WO-2014088848 A1 | 6/2014 |

OTHER PUBLICATIONS

ISA/EPO, International Search Report and Written Opinion of the International Searching Authority, Int'l. App. No. PCT/US2014/056901, Dec. 3, 2014, European Patent Office, Rijswijk, NL, 10 pgs.
Baek, Receiver Synchronization for UWB TDOA Localization, a Thesis Submitted to Oregon State University, Aug. 20, 2010, Oregon State University Libraries, 74 pgs.

* cited by examiner

*Primary Examiner* — Chandrahas Patel
(74) *Attorney, Agent, or Firm* — Holland & Hart LLP

(57) ABSTRACT

Methods, systems, and devices are described that provide for high precision synchronization between pairs of APs within a tracking area of a position location network. These tools and techniques may provide for incrementally synchronizing timers and oscillators located at respective APs. An AP may transmit a course frequency and timing acquisition signal that a second AP utilizes to estimate a frequency offset and/or time offset. The AP may transmit a subsequent fine frequency and timing acquisition signal which may be used to accurately adjust the estimated frequency offset and/or time offset of the second AP. The second AP may thus incrementally synchronize its oscillator(s) and/or timer(s). These techniques may be utilized over a multi-hop wireless network. The methods, systems, and devices may be applicable to single- and multi-floor location tracking systems.

32 Claims, 10 Drawing Sheets

HIGH PRECISION ACCESS POINT TO ACCESS POINT SYNCHRONIZATION IN AN INDOOR POSITION LOCATION SYSTEM

BACKGROUND

In some settings, such as in indoor and enterprise environments, it may be important to easily locate various types of assets or people, or both. Examples of such settings include hospitals, retail stores, warehouses, etc. The accuracy and speed with which the location of assets or people is monitored in an indoor setting may be an important factor in determining the usefulness of the tracking system. In addition, having a tracking system that is cost effective, scalable, and that can provide continuous, accurate, and precise location monitoring is also desirable.

Different systems and devices may be used to locate assets and/or people in a particular indoor environment. An ultra-wideband (UWB) network, or some other radio frequency network deployed throughout at least a portion of the indoor environment, may be configured to perform indoor tracking. Systems may employ multiple access points (APs) placed at specific locations in the indoor environment. A location tracking tag also may be attached to each mobile asset and/or to each person to be tracked. The tag may send waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person to which the tag is attached.

A position location network may need to be calibrated to provide accurate location measurements. Calibration may include synchronizing each AP with respect to every other AP in a network. It is desirable to obtain the highest precision synchronization possible. It is also desirable to obtain synchronization through multiple steps, in order to provide an efficient synchronization process.

SUMMARY

Described below are methods, systems, and/or devices that provide for high precision synchronization between pairs of APs within a tracking area of a position location network. The methods, systems, and/or devices may include tools and techniques that provide for incrementally synchronizing timers and oscillators located at respective APs. The synchronization may include a coarse frequency and timing acquisition and a fine frequency and timing acquisition. These techniques may be utilized over a multi-hop wireless network.

A first AP with one or more oscillators and timers may be used to synchronize neighboring APs. For example, the first AP may transmit narrowband signals or ultra-wideband (UWB) signals, or both, to other APs in the area. In some cases, the AP transmits a narrowband signal, which may be referred to as a course frequency and timing acquisition signal, that a second AP utilizes to estimate a frequency offset and/or time offset. The AP may transmit a subsequent UWB signal, which may be referred to as a fine frequency and timing acquisition signal, and which may be used to accurately adjust the estimated frequency offset and/or time offset of the second AP. The second AP may thus incrementally synchronize its oscillator(s) and/or timer(s)—e.g., first roughly estimating the frequency and time using the coarse signal, then adjusting the accuracy of its oscillator(s) and timer(s) using the fine signal.

A method of synchronizing two or more APs within a network of APs in a location tracking system is described. At a first AP that includes an oscillator and at least one timer, a narrowband signal is received that includes control information, including a start time. At the first AP, an estimation of a frequency offset and a time offset is generated based at least in part on the control information. At the first AP, an ultra-wideband (UWB) signal is received after the start time. At the first AP, the estimated frequency offset and the estimated time offset are adjusted based at least in part on receiving the UWB signal.

In one embodiment, the first AP may respond with an acknowledgment message that synchronization was successful. The first AP may transmit a narrowband signal comprising the control information including the start time. The first AP may transmit a UWB signal after the start time.

Estimating the frequency offset may include identifying a system frequency offset from the control information, and correcting a frequency of the oscillator based at least in part on the identified system frequency offset.

In one configuration, estimating the time offset includes identifying a system time stamp from the control information, comparing the system time stamp with a local time stamp generated by the at least one timer, and computing a time offset based upon comparing the system time stamp and the local time stamp. In one example, a time of the at least one timer may be corrected based at least in part on the computed time offset.

In one embodiment, estimating the time offset includes adjusting a computed time offset by an expected mean delay between a transmitter start of frame delimiter (SFD) and a receiver SFD. In one example, estimating the time offset includes adjusting a computed time by an expected number of cycle differences of a system clock. The cycle differences may be due to a high transmitter start of frame delimiter (SFD) frequency offset.

In one configuration, adjusting the estimated frequency offset and the estimated time offset includes identifying the start time, determining a processing time associated with the processing and the receiving the UWB signal, determining a propagation time associated with a distance between the first AP and at least a second AP. Determining a sample time may be based at least in part on the at least one timer. A time of arrival (TOA) of a direct path of the UWB signal may be estimated. A fine time offset may be determined based at least in part on the start time, the processing time, the propagation time, the sample time, and the TOA. The at least one timer and the oscillator may be shifted based upon the fine time offset.

A system configured for synchronizing two or more access points (APs) within a network of APs in a location tracking system is also described. The system includes means for receiving, at a first AP comprising an oscillator and at least one timer, a narrowband signal comprising control information including a start time, means for estimating, at the first AP, a frequency offset and a time offset based at least in part on the control information, means for receiving, at the first AP, an ultra-wideband (UWB) signal after the start time, and means for adjusting, at the AP, the estimated frequency offset and the estimated time offset based at least in part on receiving the UWB signal.

An apparatus for synchronizing two or more access points (APs) within a network of APs in a location tracking system is also described. The apparatus may include a processor, an oscillator, at least one timer, memory in electronic communication with the processor, and instructions stored in the memory. The instructions may be executable by the processor to receive a narrowband signal comprising control information including a start time, estimate a frequency offset and a time offset based at least in part on the control information, receive an ultra-wideband (UWB) signal after the start time, adjust the estimated frequency offset and the estimated time offset based at least in part on receiving the UWB signal.

A computer-program product for synchronizing two or more access points (APs) within a network of APs in a location tracking system is also described. The computer-program product comprising a non-transitory computer-readable medium storing instructions executable by a processor to receive, at a first AP comprising an oscillator and at least one timer, a narrowband signal comprising control information including a start time, estimate, at the first AP, a frequency offset and a time offset based at least in part on the control information, receive, at the first AP, an ultra-wideband (UWB) signal after the start time, and adjust, at the first AP, the estimated frequency offset and the estimated time offset based at least in part on receiving the UWB signal.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described that address issues pertaining to synchronizing APs within a network of APs in a location tracking system. The methods, systems, and/or devices may include tools and techniques that provide for incrementally synchronizing timers and oscillators located at respective APs. The synchronization may include a coarse frequency and timing acquisition and a fine frequency and timing acquisition. These techniques may be utilized over a multi-hop wireless network.

In order to determine a location of a tag based on estimation of time difference of arrival (TDOA) by a set of APs, high precision time synchronization be acquired and maintained among all the APs in a network. A master AP may transmit signals to allow other APs to synchronize their respective oscillator(s) and/or timer(s) to the master AP's oscillator(s) and/or timer(s). Synchronization may include using at least two different methods of communication to establish an accurate synchronization.

For example, two APs, within a network of APs, may each have a free-running oscillator and one or more timers. In some cases, both APs are capable of communicating over narrowband channels and ultra-wideband (UWB) channels. One AP of the pair may be designated a master AP for a network of APs, or it may be a master AP as between the two APs. A master AP may provide a frequency and time to which other APs adjust.

As mentioned, synchronization may be acquired in two stages. An initial, course frequency acquisition may be accurate to within a few parts per billion, and a coarse time acquisition may be accurate to within a few hundreds of nanoseconds. In some cases, this coarse frequency and time acquisition occurs over a narrowband link. A fine frequency acquisition may be accurate within a few parts per trillion, and a fine time acquisition may have sub-nanosecond accuracy. In some cases, this fine frequency and time acquisition occurs over an UWB link. Used in conjunction, the coarse and fine frequency and timing steps may allow a synchronizing AP to roughly estimate oscillator frequency and clock time, and then it may subsequently adjust (e.g., fine tune) frequency and time.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
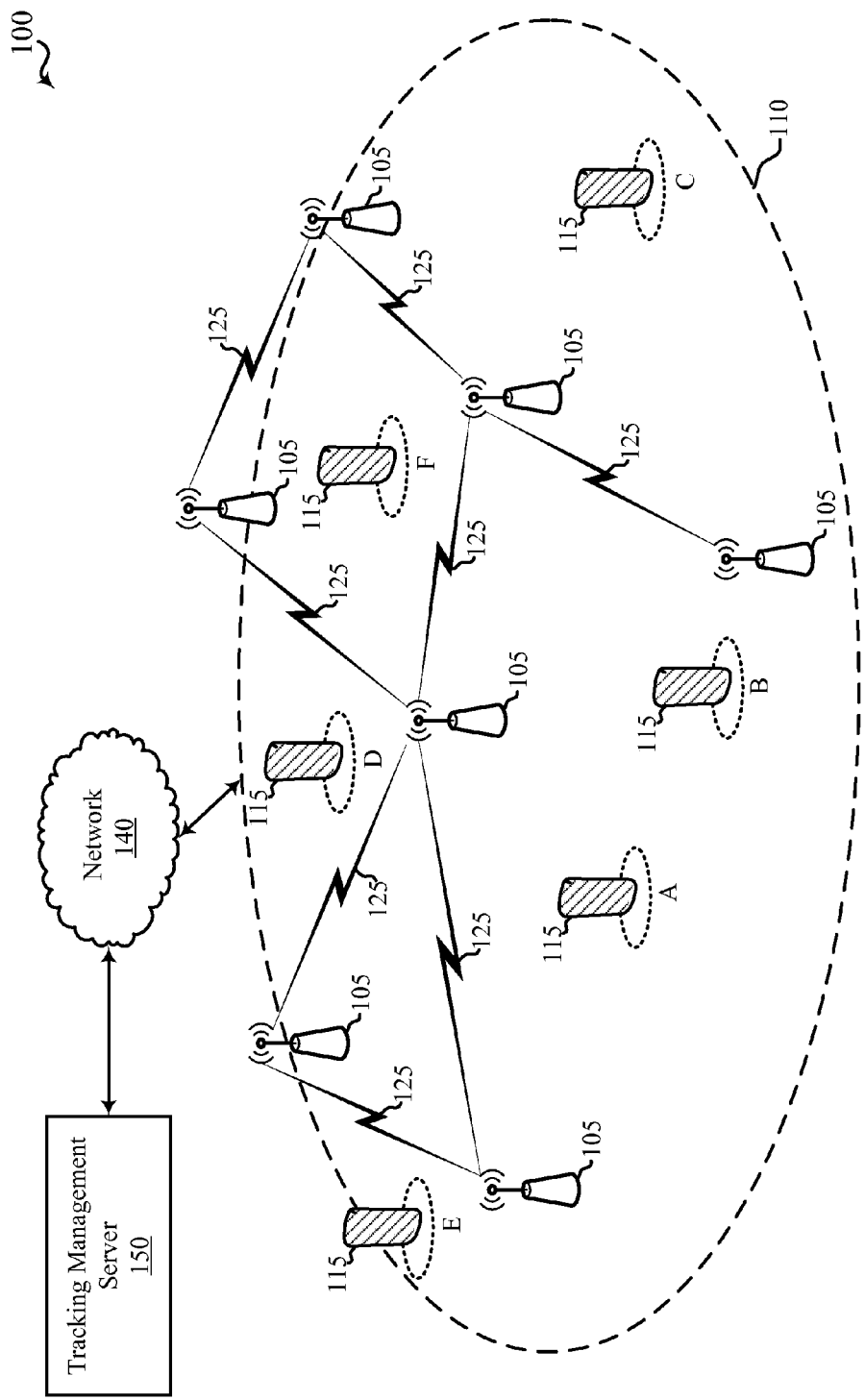
FIGS. 1A and 1B show an example(s) of a location tracking system in accordance with various embodiments.

First, FIG. 1A depicts an example of a location tracking system 100 in accordance with various embodiments. The system 100 provides location tracking of assets (e.g., objects) or people, or both, throughout the coverage area 110 associated with an indoor and/or enterprise environment. In some embodiments, the coverage area 110 represents an area of coverage inside a building, such as a hospital, a retail store, or a warehouse. Within the coverage area 110, multiple APs 105 may be deployed at specific locations, as may multiple tag units 115 (also referred to as tags and location tracking tags), which may be tracked within the coverage area 110. Because of their stationary nature, the exact distance between any two APs 105 is typically known, or may be determined, throughout the operation of the system 100. Any two APs 105 may ascertain the distance between themselves through a ranging operation, which may be a two-way ranging operation. The ranging operation may be performed via communication links 125.

The arrangement of APs 105 shown in FIG. 1A is intended as a non-limiting example. The APs 105 may be deployed or distributed within the coverage area 110 in a manner or pattern different from that depicted in FIG. 1A. For example, the APs 105 may be arranged at different distances form one another. In some cases, the coverage area 110 may represent a two-dimensional deployment, such as a single floor within a building. But in some embodiments, the APs 105 are deployed in a three-dimensional manner by placing some of the APs 105 on different floors or levels of a building within the coverage area 110.

Each of the APs 105 may be equipped with a narrowband transceiver or a UWB transceiver, or both. Additionally or alternatively, the APs 105 may include one or more oscillators or timers, or both. The oscillators may each produce a repetitive, oscillating electronic signal, which may be adjustable and/or variable. The oscillators may be RF oscillators. The oscillators may be linear- or relaxation-type. In some embodiments, the oscillators are voltage controlled, temperature compensated crystal oscillators (VCTCXO). The timers may include quartz clock(s), they may be digital, and/or they may be implemented in software or hardware using one or more counters.

The APs 105 may undergo a calibration procedure in order to increase the precision and/or accuracy of the tracking system 100. Calibration may include synchronizing the APs 105 to one another, to a network 140, and/or to a tracking management server 150. Additionally or alternatively, calibration may include determining coordinates of each AP 105.

In some cases, one or more APs 105 may be designated or selected as master APs or acting master APs that facilitate synchronization. Network-wide synchronization of APs 105 may involve designating or selecting a master AP 105 with a stable oscillator and stable timer. Each of the other APs 105 may synchronize their respective oscillators and timers to the master AP or to an acting master AP. This synchronization may include coarse and fine synchronization steps, which, in some embodiments, involves receiving and transmitting both narrowband and UWB signals.

Calibration may also include determining the coordinates of each of the APs 105 within the coverage area 110. Coordinates of each of the APs 105 may be determined incrementally, based on known coordinates of one of the APs 105 and known or determined distances between APs 105.

Each of the tag units 115 may be attached to an asset or person being tracked within the coverage area 110. The tag units 115 may be equipped with a narrowband transceiver or a UWB transmitter, or both. The tag units 115 may also have one or more oscillators or timers, or both. The oscillators may each produce a repetitive, oscillating electronic signal, which may be adjustable and/or variable. The oscillators may be RF oscillators. The oscillators may be linear- or relaxation-type. By way of example, the oscillators are VCTCXO. The timers may include quartz clock(s), they may be digital, and/or they may be implemented in software or hardware using one or more counters.

FIG. 1A depicts an example location tracking system 100 with six tag units at locations A, B, C, D, E, and F. Over time, these locations may change as the assets or people to which the tags 115 are attached move or are moved within the coverage area 110. The system 100, shown with six tags 115, is intended as a non-limiting example of a location tracking system. Those skilled in the art will recognize that the system 100 is scalable, and it may be capable of tracking more or fewer assets or people.

The system 100 includes a tracking management server 150, which also may be referred to as a tag tracking management server. In some embodiments, the tracking management server 150 is connected to the APs 105 through a network 140. The connection may be by way of a radio network associated with the APs 105. The tracking management server 150 may receive information from the APs 105 to perform various types of calculations, including: determining one or more sets of receive filters for the APs 105; detecting whether a tag 115 is mobile or stationary and adjusting update rates accordingly; estimating characteristics of communication channels; and/or estimating a location of an asset or person being tracked within the coverage area 110. The tracking management server 150 may also schedule or coordinate various operations associated with the APs 105, including when to have an AP 105 wirelessly communicate (e.g., when to transmit UWB and/or narrowband signals) with other APs 105 or with tags 115. In some embodiments, the tracking management server 150 stores information about different APs 105 and subsets of APs 105; and it may use stored information to schedule or coordinate various operations between individual APs 105 and/or subsets of APs 105.

The APs 105 may communicate with one another by sending and/or receiving UWB signals and/or narrowband signals. The channels between APs 105, which are associated with communication links 125, are often characterized by noise and signal-degrading impedances. It may therefore be beneficial to maximize the signal transmit power.

Figure 1B:
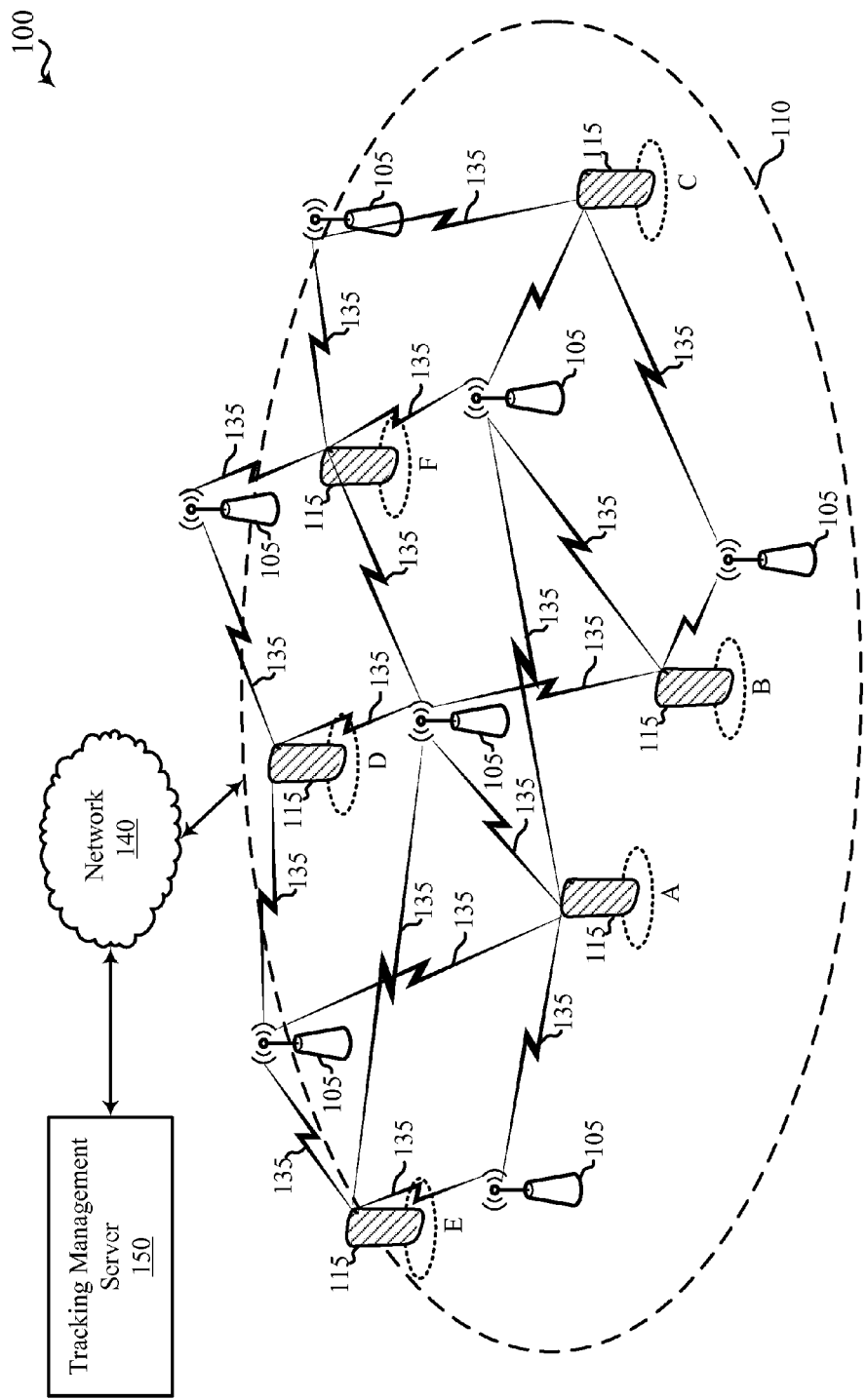

FIG. 1B illustrates transmissions or broadcasts between APs 105 and tags 115 via communication links 135. In some embodiments, the tags 115 communicate with APs 105 via the communication links 135 using either or both UWB and narrowband signals. Whether a tag 115 communicates primarily with narrowband or UWB may be a function of whether the tag 115 is mobile or stationary.

An AP 105 may communicate with other APs 105 using either or both UWB and narrowband signals. During this communication a second AP 105 may synchronize with a first AP based upon the communication. Subsequently, third and fourth APs 105 may synchronize with the first AP based upon further communication; and the process may be repeated for subsequent APs 105 within the tracking area 110. Once the APs are synchronized with one another, or the first AP, accurate location tracking, such as of a tag unit 115, may be performed.

Figure 2A:
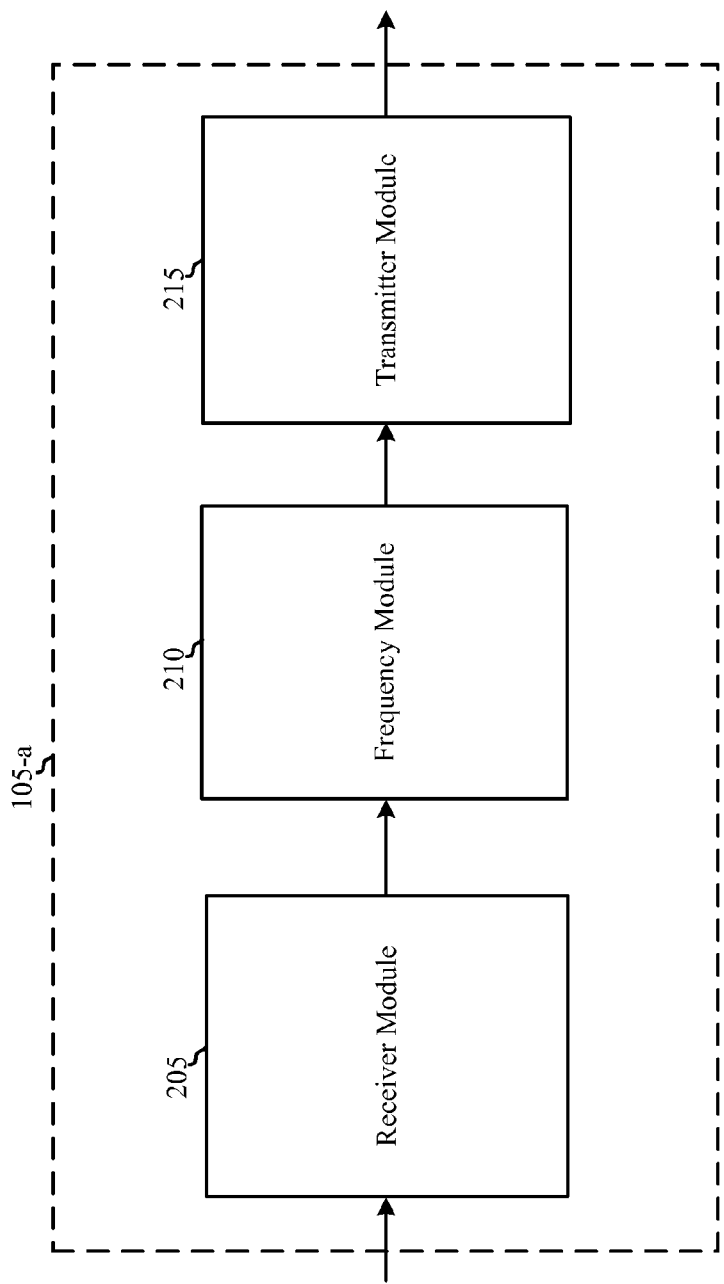
FIGS. 2A and 2B show block diagrams of an example device(s) that may be employed in location tracking systems in accordance with various embodiments.

Next, turning to FIG. 2A, a block diagram 200 illustrates a device 105-*a* configured for synchronizing APs within a network of APs in a location tracking system in accordance with various embodiments. The device 105-*a* may be an AP, which may be an example of an AP 105 of FIG. 1A or FIG. 1B, or both. The device 105-*a* may also be a processor. The device 105-*a* may include a receiver module 205, a frequency module 210, and/or a transmitter module 215. In some cases, the receiver module 205 and the transmitter module 215 are a single transceiver module. The receiver module 205 and/or the transmitter module 215 may include an integrated processor. They may also include an oscillator and/or a timer. In some embodiments, the receiver module 205 and the transmitter module 215 are a part of a UWB transceiver module, a narrowband transceiver module, or both.

The device 105-*a* may also include a frequency module 210. The frequency module 210 may include an integrated processor. It may also include an oscillator and/or timer. The frequency module 210 may estimate an offset, such as a frequency offset and/or a time offset. Further, the frequency module 210 may adjust an estimated offset. In some cases, the frequency module 210 corrects a frequency of an oscillator and/or a time of a timer.

In some embodiments, the components of the device 105-*a* are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

By way of illustration, the device 105-a, through the receiver module 205, the frequency module 210, and the transmitter module 215, may receive a radio frequency (RF) signal. The frequency module 210 may then estimate an offset based on the signal, and an oscillator and/or a timer. The receiver module 205 may receive a second RF signal and the frequency module 210 may adjust the estimated offset based on the second received signal. In some cases, the frequency module 210 adjusts its oscillator and/or timer based on the determined offset. The transmitter module 215 may transmit a signal representing the determined offset.

Figure 2B:
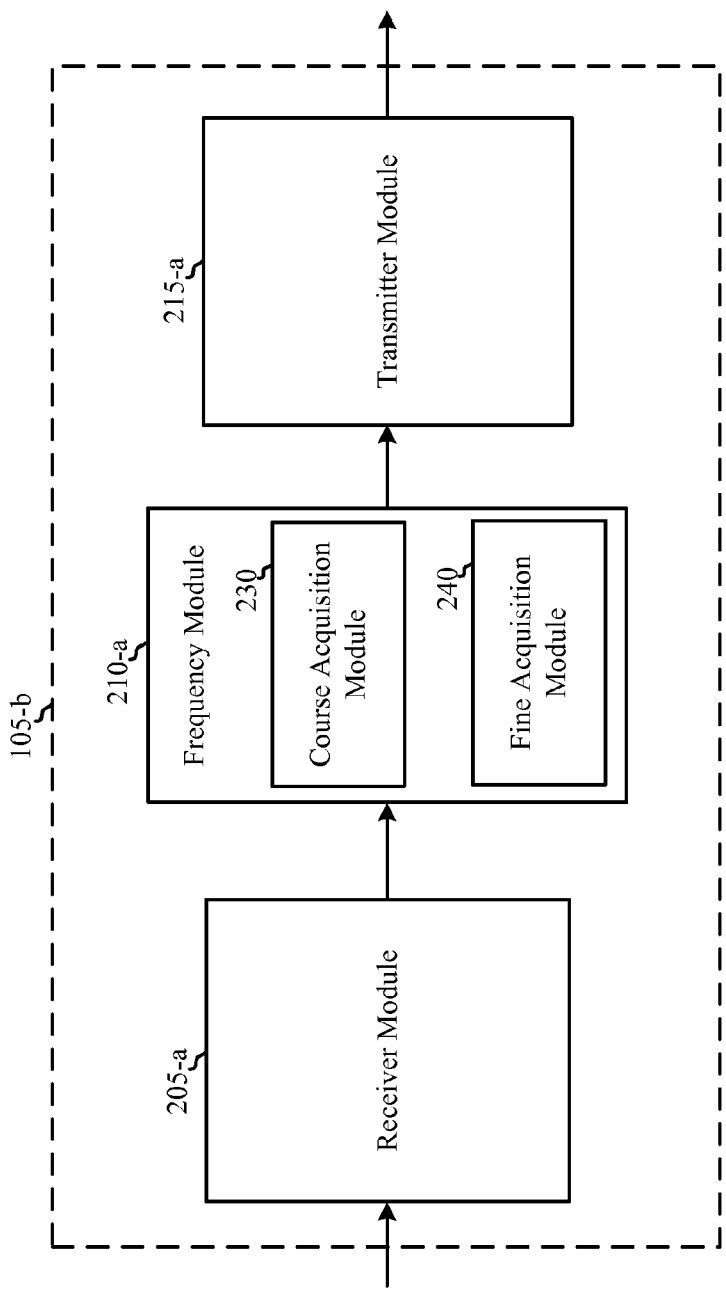

Next, FIG. 2B shows a block diagram 200-a of a device 105-b configured for synchronizing APs within a network of APs in a location tracking system in accordance with various embodiments. The device 105-b may be an example of the device 105-a of FIG. 2A; and the device 105-b may perform the same or similar functions as described above for device 105-a. In some embodiments, the device 105-b is an AP, which may include one or more aspects of the APs 105 described above with reference to any or all of FIGS. 1A, 1B, and 2A. The device 105-b may also be a processor. In some cases, the device 105-b includes a receiver module 205-a, which may be an example of the receiver module 205 of FIG. 2A; and the receiver module 205-a may perform the same or similar functions as described above for receiver module 205. In some cases, the device 105-b includes a transmitter module 215-a, which may be an example of the transmitter module 215 of FIG. 2A; and the transmitter module 215-a may perform the same or similar functions as described above for transmitter module 215.

The device 105-b may include a frequency module 210-a, which may be an example of the frequency module 210 of FIG. 2A. The frequency module 210-a may estimate an offset, such as a frequency offset and/or a time offset. Further, the frequency module 210-a may adjust an estimated offset. In some cases, the frequency module 210-a corrects a frequency of an oscillator and/or a time of a timer. In some cases, the frequency module 210-a includes a course acquisition module 230 and/or a fine acquisition module 240.

In some embodiments, the device 105-b includes the course acquisition module 230. The course acquisition module 230 may include a narrowband transceiver. The course acquisition module 230 may prepare a signal to transmit, or analyze a received signal, containing control information. In some cases the control information includes a start time. The course acquisition module 230 may estimate a frequency offset and/or a time offset based at least on the control information.

In some cases, the device 105-b includes the fine acquisition module 240. The fine acquisition module 240 may include a UWB transceiver. The fine acquisition module 240 may prepare a signal to transmit or analyze a received signal. In some cases, the fine acquisition module 240 adjusts the estimated frequency and/or time offset based on the received signal.

According to some embodiments, the components of the device 105-b are, individually or collectively, implemented with one or more ASICs adapted to perform some or all of the applicable functions in hardware. In other embodiments, the functions of device 105-b are performed by one or more processing units (or cores), on one or more integrated circuits.

In other embodiments, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 3:
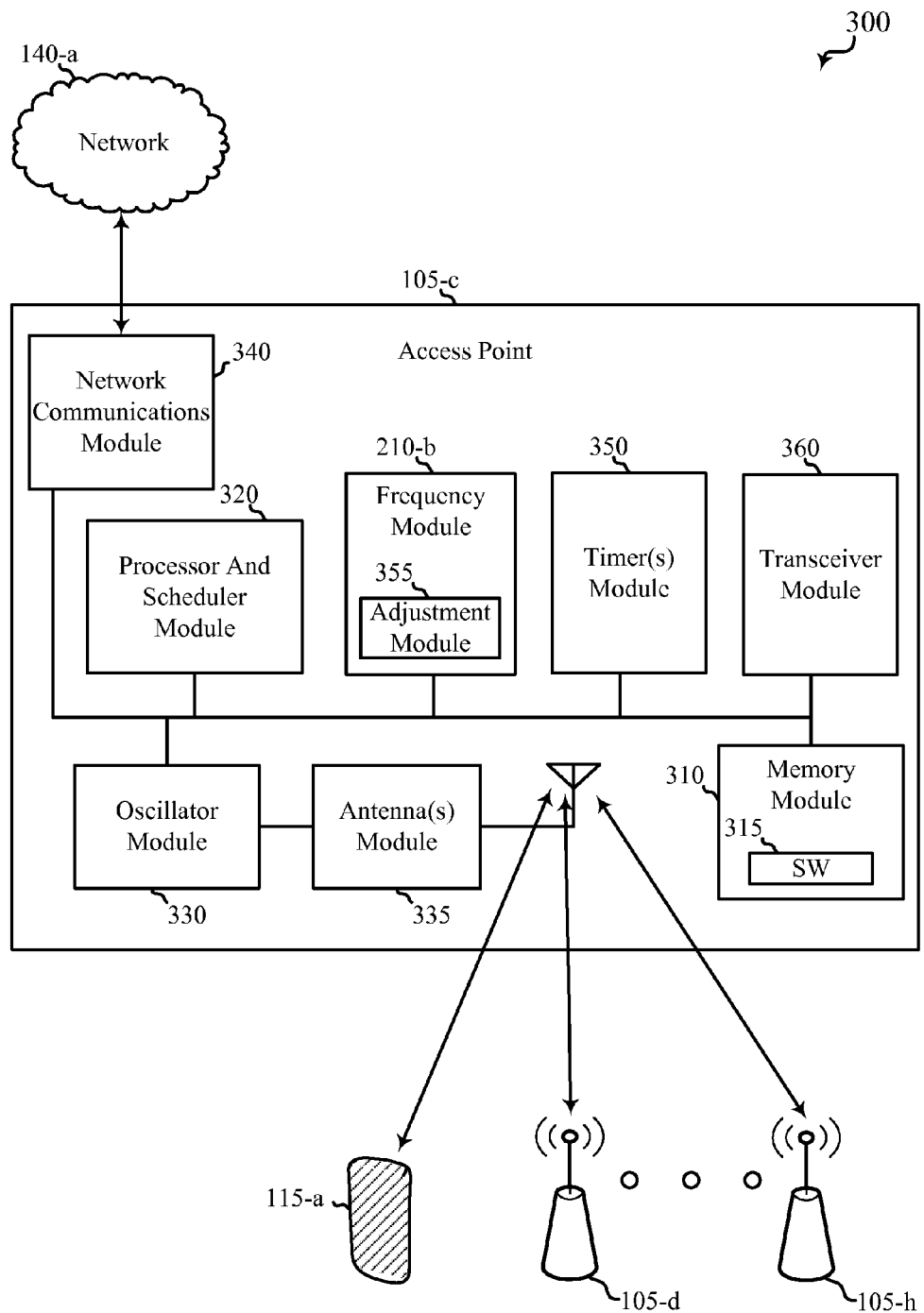
FIG. 3 shows a block diagram of an example of a location tracking system in accordance with various embodiments.

Turning now to FIG. 3, which depicts a block diagram of a system 300 configured for synchronizing APs within a network of APs in a location tracking system in accordance with various embodiments. The system 300 may include APs 105-c and 105-d through 105-h, which may be examples of the APs 105 described with reference to one or more of FIGS. 1A, 1B, 2A, and 2B. The AP 105-c may include a memory module 310, which, in some embodiments, includes a software module 315. The AP 105-c may include a processor and scheduler module 320, antenna(s) module 335, a network communications module 340, a timer(s) module 350, an oscillator module 330, a transceiver module 360, and a frequency module 210-b. In some cases, the timer(s) module 350 and/or the oscillator module 330 operate based on a 32 MHz reference timer and/or oscillator. In some embodiments, the AP 105-c and/or the frequency module 210-b also includes an adjustment module 355. Each of the components of the AP 105-c may be in communication with each other. The network communications module 340 may be in communication with the network 140-a, which may be an example of the network 140 of FIGS. 1A and 1B.

The memory module 310 may include random access memory (RAM) and read-only memory (ROM). In some embodiments, the memory module 310 also stores computer-readable, computer executable software (SW) code 315 containing instructions configured to, when executed, cause the processor and scheduler module 320 to perform various functions described herein related to synchronizing APs within a network of APs in a location tracking system. In other embodiments, the software (SW) code 315 may not be directly executable by the processor and scheduler module 320; but it may be configured to cause a computer, e.g., when compiled and executed, to perform the functions described herein.

The processor and scheduler module 320 may include an intelligent hardware device, such as a central processing unit (CPU). The processor and scheduler module 320 may perform various operations associated with synchronizing APs within a network of APs in a location tracking system. The processor and scheduler module 320 may use scheduling information received from, for example, the tracking management server 150, by way of the network 140-a, to determine when it is desirable to synchronize APs 105. The processor and scheduler module 320 may perform various operations associated with synchronizing APs within a network of APs in a location tracking system, including determining when to update a synchronization of APs 105.

The transceiver module 360 may include an ultra-wideband (UWB) transceiver and/or a narrowband transceiver. Either or both of the UWB transceiver and narrowband transceiver may include a modem configured to modulate data (e.g., packets) and provide the modulated data to the antenna(s) module 335 for transmission, and to demodulate data received from the antenna(s) module 335. Some embodiments of the AP 105-c include a single antenna; other embodiments include multiple antennas. As shown in FIG. 3, signals transmitted from a tag 115-a may be transmitted to and/or received by the AP 105-c via the antenna(s) in the antenna(s) module 335. The AP 105-c may also wirelessly communicate with other APs, such as APs 105-d through 105-h. In some embodiments, the AP 105-c may receive signals, including UWB, narrowband, and reference signals from other APs 105; and the AP 105-c may use the received signals for calibrating and/or synchronizing components of the AP 105-c; and/or the AP 105-c may use the received signals for determining a location of a tag unit 115. In some cases, the AP 105-c may transmit received signals to the tracking management server 150 via the network communications module 340 and the network 140-a.

The oscillator module 330 may be connected to the UWB transceiver. The UWB transceiver may include an UWB modulator and a radio frequency (RF) transceiver. In some embodiments, the UWB transceiver includes, or is in communication with, a timer, such as the timer(s) module 350. The UWB transceiver may include an integrated processor. The UWB transceiver may work with, or for, the frequency module 210-b to synchronize, for example, APs 105.

The transceiver module 360 may further include the narrowband transceiver. The narrowband transceiver may include an integrated processor. It may also include a timer and/or oscillator. In some cases, it is in communication with the oscillator module 330 and/or the timer(s) module 350. The narrowband transceiver may be capable of communicating with wireless local area network (WLAN) products that are based on the IEEE 802.11 family of standards (WiFi). In some embodiments, the narrowband transceiver is a two-way digital radio based on the IEEE 802.15 family of standards (ZigBee). In another embodiment, the narrowband transceiver is a two-way digital radio based on the IEEE 801.11 family of standards, such as Wi-Fi.

In some cases the frequency module 210-b may include the adjustment module 355. The adjustment module 355 may include an oscillator and/or timer. In some cases, the adjustment module 355 is in communication with the oscillator module 330 and/or the timer(s) module 350. In some cases, the adjustment module 355 adjusts an estimated frequency offset and/or an estimated time offset based on additional information received. In some embodiments, the adjustment module 355 corrects an oscillator frequency, such as the oscillator module 330, based on a synchronizing signal from another AP 105 and/or a determined frequency offset. In some cases, the adjustment module 355 corrects a time, such as the timer(s) module 350, based on a synchronizing signal from another AP 105 and/or a determined time offset. The adjustment module 355 may adjust a determined time offset and/or a determined frequency offset based at least on a start time, a processing time, and/or a propagation time of a signal.

Figure 4:
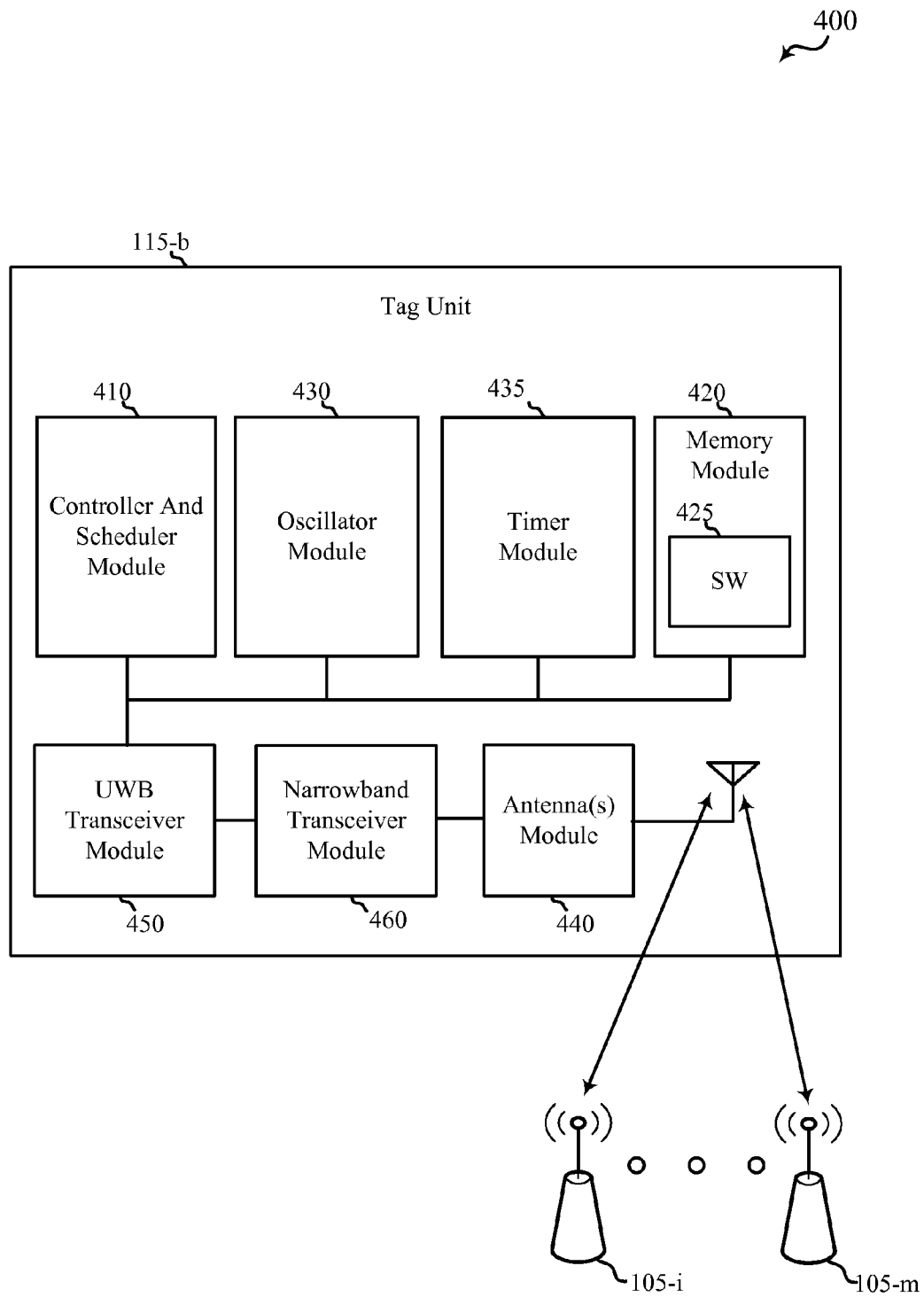
FIG. 4 shows a block diagram of an example of a location tracking system in accordance with various embodiments.

Next, FIG. 4 shows a block diagram illustrating a system 400 configured for synchronizing APs 105 within a network of APs in a location tracking system, which may include a tag unit 115-b. In some embodiments, the tag unit 115-b includes one or more aspects of the tag units 115 of any or all of FIGS. 1A, 1B, 2A, 2B, and 3. The tag unit 115-b may include a controller and scheduler module 410, a memory module 420, a UWB transceiver module 450, a narrowband transceiver module 460, and antenna(s) module 440. In some embodiments, the tag unit 115-b includes an oscillator module 430 or a timer module 435, or both. The oscillator module 430 and the timer module 435 may each include several oscillators and timers, respectively.

By way of illustration, the controller and scheduler module 410 includes logic or code, or both, that enables it to control the operations of the tag unit 115-b. In some cases, the controller and scheduler module 410 includes a microcontroller or a state machine to control the UWB transceiver module 450 and the narrowband transceiver module 460.

The memory module 420 may include random access memory (RAM) or read-only memory (ROM), or both. In some embodiments, the memory module 420 stores computer-readable, computer-executable software (SW) code 425 containing instructions that are configurable to, when executed, cause the controller and scheduler module 410 to perform various functions described herein for controlling the tag unit 115-b. In other embodiments, the software code 425 is not directly executable by the controller and scheduler module 410, but it may be configured to cause a computer, for example, when compiled and executed, to perform functions described herein.

The UWB transceiver module 450 may support radio frequency (RF) communication technology to broadcast UWB signals through the antenna(s) module 440. Likewise, the narrowband transceiver module 460 may support RF communication technology to broadcast narrowband signals through the antenna(s) module 440. In some embodiments, the UWB transceiver module 450 or the narrowband transceiver module 460, or both, include a modulator (not shown) to modulate location tracking information and provide the modulated information to the antenna(s) module 440 for transmission of signals. FIG. 4 shows broadcast and reception of signals between the tag unit 115-b and several APs 105. In the system 400, at least two APs 105-i through 105-m are shown communicating with the tag unit 115-b; but the tag unit 115-b may communicate with more or fewer APs 105.

Figure 5:
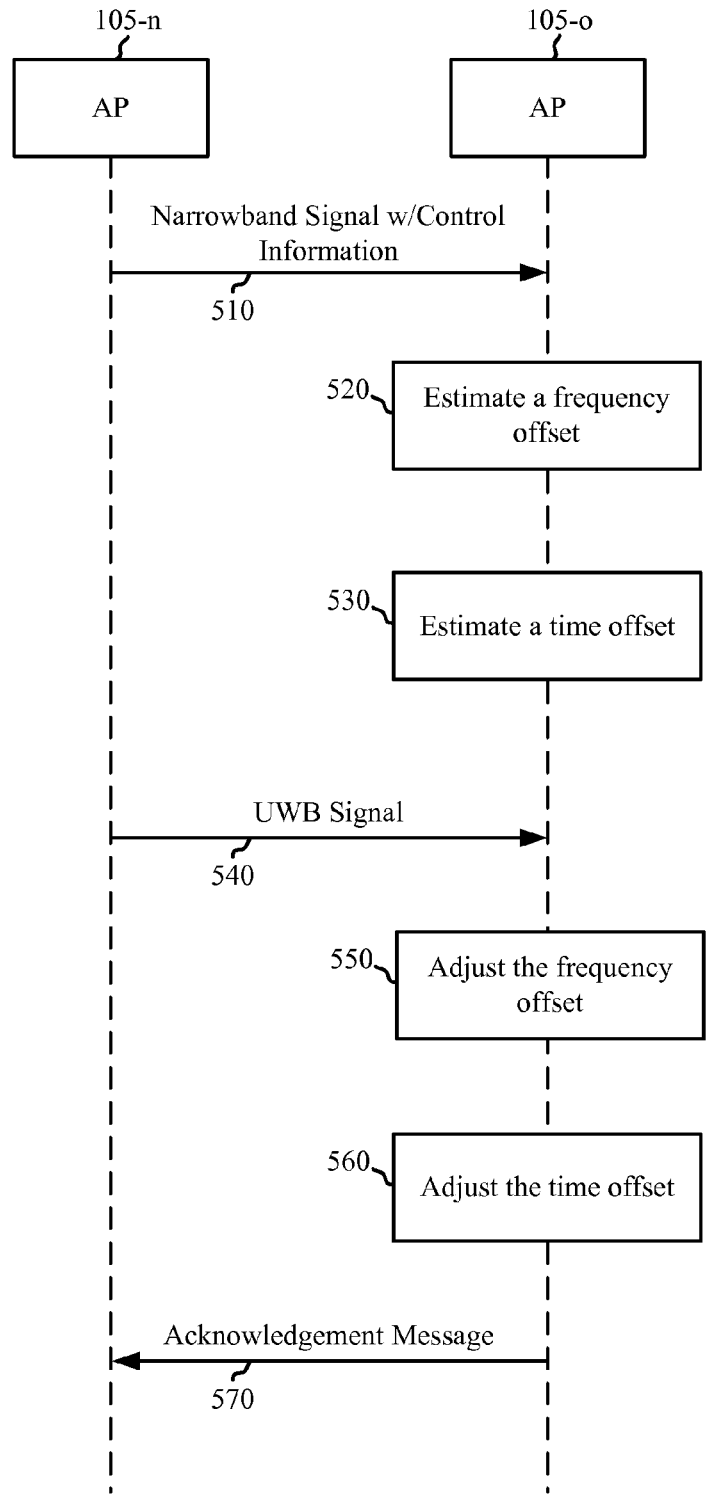
FIG. 5 shows a call flow diagram that illustrates an example of access point synchronization within a location tracking system in accordance with various embodiments.

Referring next to FIG. 5, a system 500 is illustrated with a signal flow diagram. The system 500 is configured for synchronizing APs within a network of APs in a location tracking system in accordance with various embodiments. FIG. 5 shows synchronization between two APs 105. In the system 500, two APs 105-n and 105-o are shown synchronizing, but synchronization may occur with more APs 105 as well. The APs 105-n and 105-o may be examples of the AP 105 of FIGS. 1A, 1B, 2A, 2B, 3, and/or 4.

In some cases, a first, or master AP 105-n is used to synchronize secondary APs, such as the second AP 105-o. A first communication 510 between the APs 105 may be a narrowband signal. The narrowband signal may include control information. The second AP 105-o may use this first communication 510 to estimate a frequency offset 520. Estimating the frequency offset 520 may include identifying a system frequency offset from the control information and/or correcting a frequency of an oscillator based at least partially on the identified system frequency offset. Further, the second AP 105-o may use the first communication 510 to estimate a time offset 530. Estimating the time offset 530 may include identifying a system time stamp from the control information, comparing the system time stamp to a local time stamp generated by a timer at AP 105-n, and/or computing a time offset based at least partially on comparing the system time stamp and the local time stamp. In some cases, estimating the time offset 530 also includes correcting a time of a timer based at least partially on the computed time offset. In some embodiments, estimating the time offset 530 includes adjusting a computed time offset by an expected mean delay between a transmitter start of frame delimiter (SFD) and a receiver SFD. In some cases, estimating the time offset 530 includes adjusting a computed time offset by an expected number of cycle differences of a system clock, where the cycle differences are due to a high transmitter SFD frequency offset.

The system 500 may include a second communication 540 between the APs, which may be an UWB signal. In some cases, the second AP 105-o may adjust a frequency offset 550 based at least in part on the second communication 540. Further, in some embodiments, the second AP 105-o adjusts a time offset 560 based at least in part on the second communication 540. Adjusting a frequency offset 550 and/or adjusting a time offset 560 may include identifying a start time, determining a processing time associated with processing and receiving a signal, and/or determining a propagation time associated with a distance between at least the first and second APs 105-*n*, 105-*o*. In some cases, adjusting a frequency offset 550 and/or adjusting a time offset 560 further includes determining a sample time based at least partially on a timer, estimating a time of arrival (TOA) of a direct path of a signal, determining a fine time offset based at least partially on the start time, the processing time, the propagation time, the sample time, and the TOA, and/or shifting at least one timer and/or oscillator based upon the fine time offset. In some cases, a third communication 570, which may be referred to as a response, may occur from the second AP 105-*i* to the first AP 105-*h*, and may include an acknowledgment message or another signal indicating whether the synchronization was successful.

Figure 6:
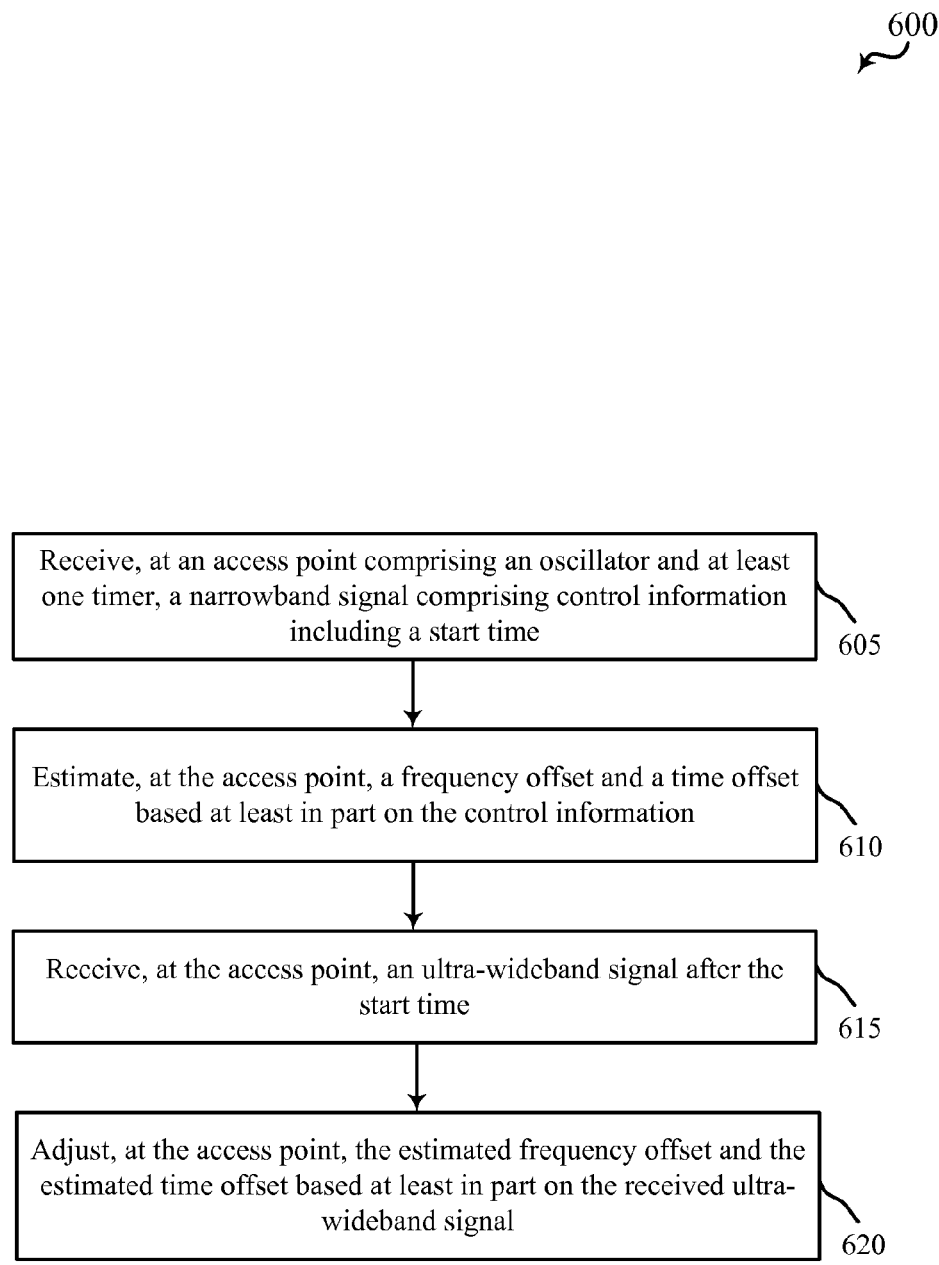
FIGS. 6, 7, and 8 are flow diagrams that depict a method or methods of communication within a location tracking system in accordance with various embodiments.

Next, FIG. 6 shows a flow diagram, which illustrates a method 600 of synchronizing APs within a network of APs in a location tracking system, according to some embodiments. By way of illustration, the method 600 is implemented using the one or more of the devices and systems 100, 200-*a*, 200-*b*, 300, 400, and 500 of FIGS. 1A, 1B, 2A, 2B, 3, 4, and 5.

At block 605, an AP 105, that has an oscillator and at least one timer, may receive a narrowband signal comprising control information including a start time. At block 610, an AP 105 may estimate a frequency offset and a time offset based at least in part on the control information. At block 615, an AP 105 may receive an ultra-wideband signal after the start time. At block 620, an AP 105 may adjust the estimated frequency offset and the estimated time offset based at least in part on the received ultra-wideband signal.

Those skilled in the art will recognize that the method 600 is but one implementation of the tools and techniques discussed herein. The operations of the method 600 may be rearranged or otherwise modified such that other implementations are possible.

Figure 7:
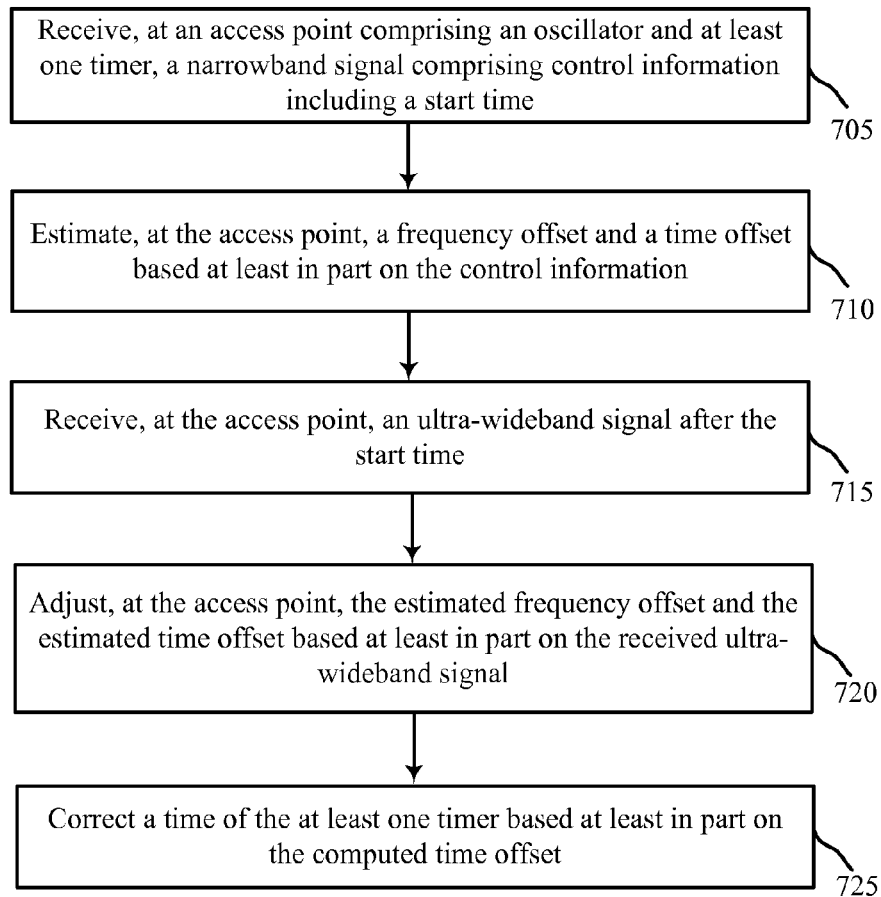

FIG. 7 shows a flow diagram that illustrates a method 700 for synchronizing APs within a network of APs in a location tracking system, according to various embodiments. The method 700 may be implemented using, for example, the devices and systems 100, 200-*a*, 200-*b*, 300, 400, and 500 of FIGS. 1A, 1B, 2A, 2B, 3, 4, and 5.

At block 705, an AP 105, that has an oscillator and at least one timer, may receive a narrowband signal comprising control information including a start time. At block 710, an AP 105 may estimate a frequency offset and a time offset based at least in part on the control information. At block 715, an AP 105 may receive an ultra-wideband signal after the start time. At block 720, an AP 105 may adjust the estimated frequency offset and the estimated time offset based at least in part on the received ultra-wideband signal. At block 725, an AP 105 may correct a time of the at least one timer based at least in part on the computed time offset.

A skilled artisan will notice that the method 700 illustrates one implementation of the tools and techniques described herein. The operations of the method 700 may be rearranged or otherwise modified such that other implementations are possible.

Figure 8:
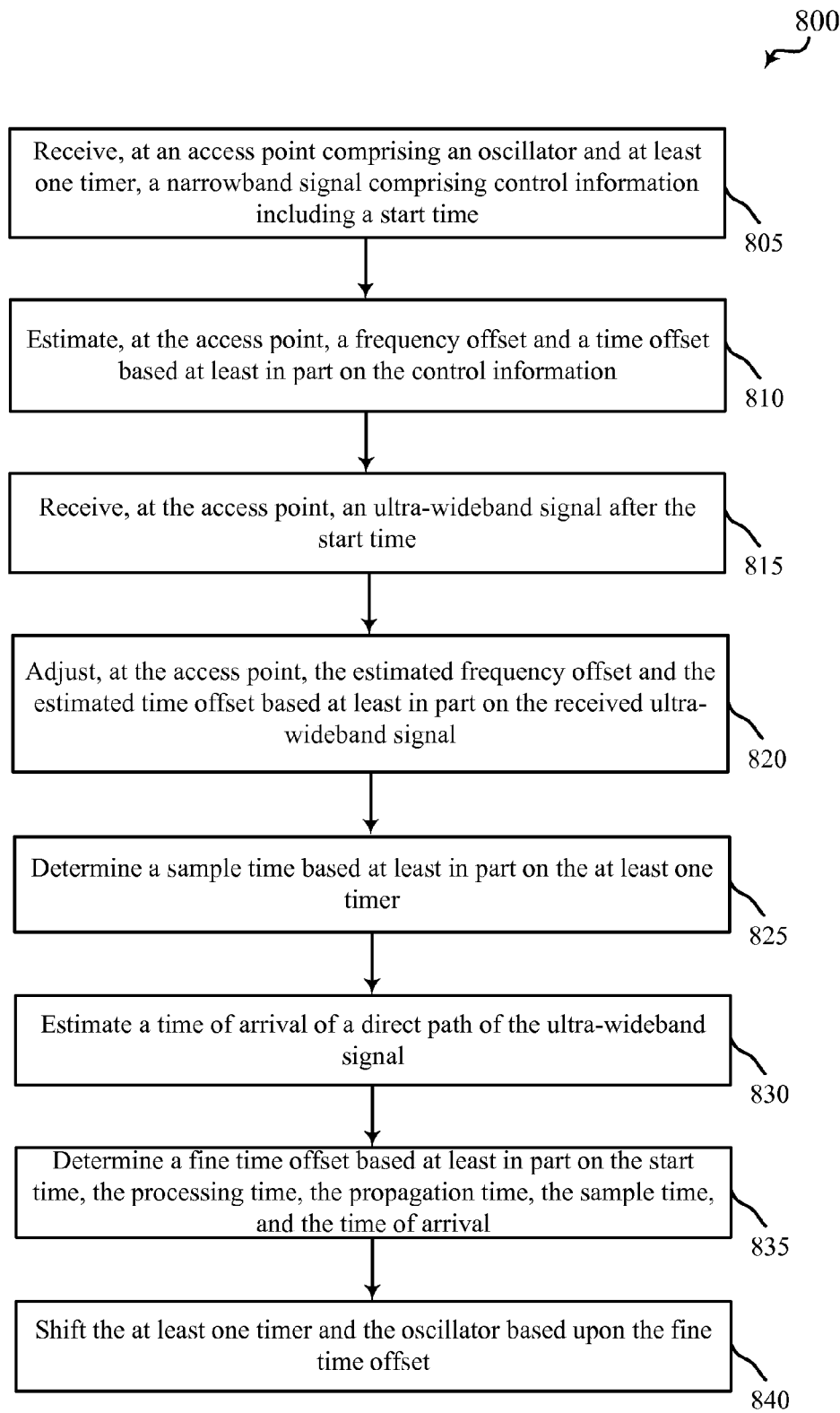

FIG. 8 shows a flow diagram that illustrates a method 800 for synchronizing APs within a network of APs in a location tracking system, according to some embodiments. In some cases, the method 800 may be implemented using some or all of the devices and systems 100, 200-*a*, 200-*b*, 300, 400, and 500 of FIGS. 1A, 1B, 2A, 2B, 3, 4, and 5.

At block 805, an AP 105, that has an oscillator and at least one timer, may receive a narrowband signal comprising control information including a start time. At block 810, an AP 105 may estimate a frequency offset and a time offset based at least in part on the control information. At block 815, an AP 105 may receive an ultra-wideband signal after the start time. At block 820, an AP 105 may adjust the estimated frequency offset and the estimated time offset based at least in part on the received ultra-wideband signal. At block 825, an AP 105 may determine a sample time based at least in part on the at least one timer. At block 830, an AP 105 may estimate a time of arrival of a direct path of the ultra-wideband signal. At block 835, an AP 105 may determine a fine time offset based at least in part on the start time, the processing time, the propagation time, the sample time, and the time of arrival. At block 840, an AP 105 may shift the at least on timer and the oscillator based upon the fine time offset.

One skilled in the art will recognize that the method 800 is just one implementation of the tools and techniques described herein. The operations of the method 800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of synchronizing two or more access points (APs) within a network of APs in a location tracking system, comprising:
    receiving, at a first AP comprising an oscillator and at least one timer, a narrowband signal comprising control information including a start time;
    estimating, at the first AP, a frequency offset and a time offset based at least in part on the control information;
    receiving, at the first AP, an ultra-wideband (UWB) signal after the start time;
    adjusting, at the first AP, the estimated frequency offset and the estimated time offset based at least in part on receiving the UWB signal;
    responding, from the first AP, with an acknowledgment that synchronization was successful;
    transmitting, from the first AP to a second AP, a second narrowband signal comprising the control information including the start time; and
    transmitting, from the first AP to the second AP, a second UWB signal after the start time.

2. The method of claim 1, wherein adjusting the estimated frequency offset and the estimated time offset comprises:
    identifying the start time;
    determining a processing time associated with processing and the receiving the UWB signal; and
    determining a propagation time associated with a distance between the first AP and at least the second AP.

3. The method of claim 2, further comprising:
    determining a sample time based at least in part on the at least one timer;
    estimating a time of arrival (TOA) of a direct path of the UWB signal;
    determining a fine time offset based at least in part on the start time, the processing time, the propagation time, the sample time, and the TOA; and
    shifting the at least one timer and the oscillator based upon the fine time offset.

4. The method of claim 1, wherein estimating the frequency offset comprises:
    identifying a system frequency offset from the control information; and
    correcting a frequency of the oscillator based at least in part on the identified system frequency offset.

5. The method of claim 1, wherein estimating the time offset comprises:
    identifying a system time stamp from the control information;
    comparing the system time stamp with a local time stamp generated by the at least one timer; and
    computing the time offset based upon comparing the system time stamp and the local time stamp.

6. The method of claim 5, further comprising:
    correcting a time of the at least one timer based at least in part on the computed time offset.

7. The method of claim 1, wherein estimating the time offset comprises:
    adjusting a computed time offset by an expected mean delay between a transmitter start of frame delimiter (SFD) and a receiver SFD.

8. The method of claim 1, wherein estimating the time offset comprises:
    adjusting a computed time by an expected number of cycle differences of a system clock, the cycle differences due to a high transmitter start of frame delimiter (SFD) frequency offset.

9. A system configured for synchronizing two or more access points (APs) within a network of APs in a location tracking system, the system comprising:
    means for receiving, at a first AP comprising an oscillator and at least one timer, a narrowband signal comprising control information including a start time;
    means for estimating, at the first AP, a frequency offset and a time offset based at least in part on the control information;
    means for receiving, at the first AP, an ultra-wideband (UWB) signal after the start time;
    means for adjusting, at the first AP, the estimated frequency offset and the estimated time offset based at least in part on receiving the UWB signal;
    means for responding, from the first AP, with an acknowledgment that synchronization was successful;
    means for transmitting, from the first AP to a second AP, a second narrowband signal comprising the control information including the start time; and
    means for transmitting, from the first AP to the second AP, a second UWB signal after the start time.

10. The system of claim 9, wherein estimating the time offset comprises:
means for adjusting a computed time offset by an expected mean delay between a transmitter start of frame delimiter (SFD) and a receiver SFD.

11. The system of claim 9, wherein estimating the time offset comprises:
means for adjusting a computed time by an expected number of cycle differences of a system clock, the cycle differences due to a high transmitter start of frame delimiter (SFD) frequency offset.

12. The system of claim 9, wherein adjusting the estimated frequency offset and the estimated time offset comprises:
means for identifying the start time;
means for determining a processing time associated with processing and the receiving the UWB signal; and
means for determining a propagation time associated with a distance between the first AP and at least the second AP.

13. The system of claim 12, further comprising:
means for determining a sample time based at least in part on the at least one timer;
means for estimating a time of arrival (TOA) of a direct path of the UWB signal;
means for determining a fine time offset based at least in part on the start time, the processing time, the propagation time, the sample time, and the TOA; and
means for shifting the at least one timer and the oscillator based upon the fine time offset.

14. The system of claim 9, wherein estimating the frequency offset comprises:
means for identifying a system frequency offset from the control information; and
means for correcting a frequency of the oscillator based at least in part on the identified system frequency offset.

15. The system of claim 9, wherein estimating the time offset comprises:
means for identifying a system time stamp from the control information;
means for comparing the system time stamp with a local time stamp generated by the at least one timer; and
means for computing the time offset based upon comparing the system time stamp and the local time stamp.

16. The system of claim 15, further comprising:
means for correcting a time of the at least one timer based at least in part on the computed time offset.

17. A computer-program product for synchronizing two or more access points (APs) within a network of APs in a location tracking system, the computer-program product comprising a non-transitory computer-readable medium storing instructions executable by a processor to:
receive, at a first AP comprising an oscillator and at least one timer, a narrowband signal comprising control information including a start time;
estimate, at the first AP, a frequency offset and a time offset based at least in part on the control information;
receive, at the first AP, an ultra-wideband (UWB) signal after the start time;
adjust, at the first AP, the estimated frequency offset and the estimated time offset based at least in part on receiving the UWB signal;
respond, from the first AP, with an acknowledgment that synchronization was successful;
transmit, from the first AP to a second AP, a second narrowband signal comprising the control information including the start time; and
transmit, from the first AP to the second AP, a second UWB signal after the start time.

18. The computer-program product of claim 17, wherein the instructions executable by the processor to estimate the frequency offset are executable by the processor to:
identify a system frequency offset from the control information; and
correct a frequency of the oscillator based at least in part on the identified system frequency offset.

19. The computer-program product of claim 17, wherein the instructions executable by the processor to estimate the time offset are executable by the processor to:
identify a system time stamp from the control information;
compare the system time stamp with a local time stamp generated by the at least one timer; and
compute the time offset based upon comparing the system time stamp and the local time stamp.

20. The computer-program product of claim 19, wherein the instructions are further executable by the processor to:
correct a time of the at least one timer based at least in part on the computed time offset.

21. The computer-program product of claim 17, wherein the instructions executable by the processor to estimate the time offset are executable by the processor to:
adjust a computed time offset by an expected mean delay between a transmitter start of frame delimiter (SFD) and a receiver SFD.

22. The computer-program product of claim 17, wherein instructions executable by the processor to estimate the time offset are executable by the processor to:
adjust a computed time by an expected number of cycle differences of a system clock, the cycle differences due to a high transmitter start of frame delimiter (SFD) frequency offset.

23. The computer-program product of claim 17, wherein the instructions executable by the processor to adjust the estimated frequency offset and the estimated time offset are executable by the processor to:
identify the start time;
determine a processing time associated with processing and the receiving the UWB signal; and
determine a propagation time associated with a distance between the first AP and at least the second AP.

24. The computer-program product of claim 23, wherein the instructions are further executable by the processor to:
determine a sample time based at least in part on the at least one timer;
estimate a time of arrival (TOA) of a direct path of the UWB signal;
determine a fine time offset based at least in part on the start time, the processing time, the propagation time, the sample time, and the TOA; and
shift the at least one timer and the oscillator based upon the fine time offset.

25. An apparatus for synchronizing two or more access points (APs) within a network of APs in a location tracking system, the apparatus comprising:
a processor;
an oscillator;
at least one timer;
memory in electronic communication with the processor; and
instructions stored in the memory, the instructions being executable by the processor to:
receive a narrowband signal comprising control information including a start time;

estimate a frequency offset and a time offset based at least in part on the control information;
receive an ultra-wideband (UWB) signal after the start time;
adjust the estimated frequency offset and the estimated time offset based at least in part on receiving the UWB signal;
respond with an acknowledgment that synchronization was successful;
transmit a second narrowband signal comprising the control information including the start time; and
transmit a second UWB signal after the start time.

26. The apparatus of claim 25, wherein the instructions executable by the processor to estimate the frequency offset are executable by the processor to:
identify a system frequency offset from the control information; and
correct a frequency of the oscillator based at least in part on the identified system frequency offset.

27. The apparatus of claim 25, wherein the instructions executable by the processor to estimate the time offset are executable by the processor to:
adjust a computed time offset by an expected mean delay between a transmitter start of frame delimiter (SFD) and a receiver SFD.

28. The apparatus of claim 25, wherein the instructions executable by the processor to estimate the time offset are executable by the processor to:
adjust a computed time by an expected number of cycle differences of a system clock, the cycle differences due to a high transmitter start of frame delimiter (SFD) frequency offset.

29. The apparatus of claim 25, wherein the instructions executable by the processor to estimate the frequency offset are executable by the processor to:
identify the start time;
determine a processing time associated with processing and the receiving the UWB signal; and
determine a propagation time associated with a distance between the first AP and at least the second AP.

30. The apparatus of claim 29, wherein the instructions are further executable by the processor to:
determine a sample time based at least in part on the at least one timer;
estimate a time of arrival (TOA) of a direct path of the UWB signal;
determine a fine time offset based at least in part on the start time, the processing time, the propagation time, the sample time, and the TOA; and
shift the at least one timer and the oscillator based upon the fine time offset.

31. The apparatus of claim 25, wherein the instructions executable by the processor to estimate the time offset are executable by the processor to:
identify a system time stamp from the control information;
compare the system time stamp with a local time stamp generated by the at least one timer; and
compute the time offset based upon comparing the system time stamp and the local time stamp.

32. The apparatus of claim 31, wherein the instructions are further executable by the processor to:
correct a time of the at least one timer based at least in part on the computed time offset.

* * * * *